(12) United States Patent
Sundaresan

(10) Patent No.: US 11,220,042 B2
(45) Date of Patent: Jan. 11, 2022

(54) SYSTEMS AND METHODS FOR ADDITIVE MANUFACTURING

(71) Applicant: OHIO STATE INNOVATION FOUNDATION, Columbus, OH (US)

(72) Inventor: Vishnu Baba Sundaresan, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 300 days.

(21) Appl. No.: 15/549,101

(22) PCT Filed: Feb. 4, 2016

(86) PCT No.: PCT/US2016/016597
§ 371 (c)(1),
(2) Date: Aug. 4, 2017

(87) PCT Pub. No.: WO2016/126962
PCT Pub. Date: Aug. 11, 2016

(65) Prior Publication Data
US 2018/0036939 A1    Feb. 8, 2018

Related U.S. Application Data

(60) Provisional application No. 62/111,734, filed on Feb. 4, 2015.

(51) Int. Cl.
*B29C 64/209*    (2017.01)
*B29C 64/112*    (2017.01)
(Continued)

(52) U.S. Cl.
CPC .......... *B29C 64/112* (2017.08); *B29C 64/209* (2017.08); *B33Y 30/00* (2014.12);
(Continued)

(58) Field of Classification Search
CPC .... B29C 64/209; B29C 64/227; B29C 64/295
See application file for complete search history.

(56) References Cited

U.S. PATENT DOCUMENTS 2,323,030 A * 6/1943 Gruetzmacher ....... B01D 45/02
310/322
6,149,072 A * 11/2000 Tseng ..................... B22F 3/008
239/87

(Continued)

FOREIGN PATENT DOCUMENTS

WO    2005069858 A2    1/2005
WO    20140200595 A2    12/2014

OTHER PUBLICATIONS

International Search Report and Written Opinion issued in Application No. PCT/US2016/016597, dated Jun. 10, 2016.
(Continued)

*Primary Examiner* — Timothy Kennedy
*Assistant Examiner* — Alexander A Wang
(74) *Attorney, Agent, or Firm* — Meunier Carlin & Curfman LLC

(57) ABSTRACT

Disclosed herein are systems and methods method of additively manufacturing distributed sensors in a structural workpiece. The apparatus includes a movable head having an actuator coupled to an ejection port to regulate dispensation of a first thermoplastic polymer fed from an elongated chamber located in the movable head and coupled to the ejection port, wherein the movable printer head comprises a pair of electrodes proximately positioned relative to the chamber so as to direct an electric field, when the electrodes are energized, thereacross or therethough. The apparatus further includes an electric circuit operatively connected to the pair of electrodes, the electric circuit being configured to generate a poling voltage.

16 Claims, 10 Drawing Sheets

(51) Int. Cl.
*B33Y 70/00* (2020.01)
*B33Y 30/00* (2015.01)
*B33Y 10/00* (2015.01)
*B33Y 40/00* (2020.01)

(52) U.S. Cl.
CPC .............. *B33Y 70/00* (2014.12); *B33Y 10/00* (2014.12); *B33Y 40/00* (2014.12)

(56) References Cited

U.S. PATENT DOCUMENTS

| | | |
|---|---|---|
| 8,419,996 B2 | 4/2013 | Swanson et al. |
| 2008/0254913 A1 | 10/2008 | Morgan et al. |
| 2009/0152371 A1* | 6/2009 | Stark ..................... B05B 5/0255 239/3 |
| 2014/0023837 A1 | 1/2014 | Miller et al. |
| 2014/0042657 A1 | 2/2014 | Mulliken et al. |
| 2014/0264294 A1 | 9/2014 | Holman et al. |
| 2015/0024309 A1 | 1/2015 | Martin |
| 2015/0183162 A1* | 7/2015 | Kuk ..................... B29C 64/112 264/129 |
| 2017/0217089 A1* | 8/2017 | Batchelder ............ B29C 64/106 |

OTHER PUBLICATIONS

International Preliminary Report on Patentability issued in Application No. PCT/US2016/106597, dated Aug. 17, 2017.

* cited by examiner

SYSTEMS AND METHODS FOR ADDITIVE MANUFACTURING

CROSS-REFERENCE TO RELATED APPLICATIONS

This application is a national stage application filed under 35 U.S.C. § 371 of PCT/US2016/016597, filed Feb. 4, 2016, which claims benefit of U.S. Provisional Application No. 62/111,734, filed Feb. 4, 2015, which is hereby incorporated herein by reference in its entirety.

BACKGROUND

Additive manufacturing, also known as three-dimensional (3D) printing, synthesizes a three-dimensional workpiece by successively forming, under computer control, layers of materials to create an object. Examples of such workpieces may include structural components in aircraft structures, automotive bodies, watercraft vessels, building panels, and various structural members.

One type of additive manufacturing techniques enables the fabrication of structural composites (using single or multi-material systems) with sensors embedded in the fabricated structure for actuation and sensing. That is, prefabricated sensors are placed within the structural composite, which are being successively formed around the sensor.

What is desired are systems and methods where additively fabricating sensors contemporaneously with the structural components to which the sensors is embedded.

SUMMARY

Exemplified herein is an additive manufacturing process using thermal processing of polymeric substrates and nanophase smart materials to produce seamless three-dimensional composite workpiece with sensors elements (e.g., having intrinsic actuation and sensing properties) embedded therein. The exemplified smart materials are used, in some embodiments, in the manufacturing of structural components (e.g., polymer matrix with microparticulate components) that are subject to wear and fatigue (e.g., creep). The sensors in the smart materials may be continuously monitored or at periodic testing and/or maintenance operations to assess for structural wear.

Because the embedded sensor elements are contemporaneously fabricated with the structural components (e.g., polymer matrix), the embedded sensor elements can be fabricated with custom geometries and sizes. In addition, the embedded sensor elements can be customized to detect in specific planes, or multiple planes, of sensing orientations.

In addition, because the embedded sensor elements are contemporaneously fabricated with the structural components, the density of the embedded sensor elements may be increased for a given volume of the fabricated structural materials. An array of distributed sensors may thus be deployed for a given structural component.

In addition, the exemplified additive manufacturing process may be used in the validation of structural finite element calculations. The process enables a fabrication technique to prepare a composite structure (e.g., a thermoplastic or thermoset, such as epoxy) in which the sensing microparticulate components and structural component (e.g., polymer matrix) prepared simultaneously and fabricated into a structure. This leads to a structure with sensor elements distributed in three-dimensional space for visualizing stress distribution. A structural optimization experimental methodology may be used to compliment the distributed sensing technology.

In an aspect, an additive manufacturing apparatus is disclosed. The apparatus includes a movable head having an actuator coupled to an ejection port to regulate dispensation of a first thermoplastic polymer (e.g. thermoplastic ionomer) fed from an elongated chamber located in the movable head and coupled to the ejection port. The movable printer head includes a pair of electrodes proximately positioned relative to the chamber so as to direct an electric field, when the electrodes are energized, thereacross or therethrough, each of the pair of electrodes having a length corresponding to an axis of elongation associated with the elongated chamber. The apparatus further includes an electric circuit operatively connected to the pair of electrodes, the electric circuit being configured to generate an electric field. In some embodiments, the electric field is a poling field. In some embodiments, the electric field has a magnitude sufficient induce the orienting of the material being extruded along a given direction. In other embodiments, the electric field is of sufficient strength to provide granular controls of the output flow of the extruded material.

In some embodiments, the additive manufacturing apparatus comprises a 3D printer.

In some embodiments, the pair of electrodes comprises an actuator element and a chamber element, wherein the actuator element comprises a needle member configured to move within and along, between a dispensing configuration and a closed configuration, via a piezoelectric actuator coupled thereto, the elongated chamber, and wherein the chamber element comprises a plate member fixably coupled to the elongated chamber.

In some embodiments, the chamber element is fixably coupled to an interior surface of the elongated chamber.

In some embodiments, the chamber element is fixably coupled to an exterior surface of the elongated chamber. In some embodiments, the chamber element is embedded within side walls forming the elongated chamber. In some embodiments, the plate member comprises a curved surface.

In some embodiments, each of the pair of electrodes comprises a plate member fixably coupled to the elongated chamber. In some embodiments, at least one of the plate member comprises a curved surface.

In some embodiments, the ejection port terminates at an opening having a piezoelectric device coupled thereto.

In some embodiments, the movable head comprises a second actuator coupled to a second ejection port to regulate dispensing of a second thermoplastic polymer fed from a second chamber located in the movable head.

In some embodiments, the ejection port has a first aperture size and the second ejection port has a second aperture size, the second aperture size being larger than the first aperture size.

In some embodiments, the thermoplastic ionomer further comprises functional nanoparticles dispersed therein. The functional nanoparticles can be, for example, piezoelectric particles, magnetostrictive particles, ferroelectric particles, mechanoluminescent particles, conductive particles, or a combination thereof. Appropriate functional particles can be selected to imbue the resultant ionomer-nanoparticle composite with the particular functional characteristics for a desired application (e.g., to produce a composite with desirable sensory behavior). In some embodiments, the functional nanoparticles can comprise piezoelectric nanoparticles. In some embodiments, the functional nanoparticles can comprise magnetostrictive nanoparticles. In some embodiments, the functional nanoparticles can comprise mechanoluminescent nanoparticles.

In some embodiments, the functional nanoparticles comprise piezoelectric nanoparticles, and the electric circuit is configured to generate a poling voltage. In these embodiments, the applied electric field can function to pole the piezoelectric material concurrent with deposition of the ionomer-nanoparticle composite.

In some embodiments, the first thermoplastic polymer comprises a thermoplastic ionomer. Any suitable thermoplastic ionomer can be used. In some embodiments, the thermoplastic ionomer can comprise an ethylene copolymer ionomer. In certain embodiments, the ethylene copolymer ionomer can be derived from (i) ethylene; (ii) one or more (meth)acrylate monomers; (iii) one or more carboxylic acid-containing monomers; and (iv) optionally one or more additional ethylenically-unsaturated monomers, excluding monomers (i)-(iii). In some embodiments, the thermoplastic ionomer can comprise an ionene polymer or copolymer, such as a poly(alkylene oxide-co-ionenes) (e.g., poly(propylene glycol)-based ammonium ionenes and poly(ethylene glycol)-based ammonium ionenes) and poly(dialkyl siloxane-co-ionenes) (e.g., poly(dimethyl siloxane)-based ammonium ionenes).

In some embodiments, the first thermoplastic polymer and the second thermoplastic polymer comprises the same polymer. For example, in certain embodiments, both the first thermoplastic polymer and the second thermoplastic polymer can comprise the same thermoplastic ionomer.

In some embodiments, the apparatus further comprises a controller operatively coupled to the movable head, the controller having a processor and a memory, the memory having instructions stored thereon, wherein execution of the instructions, cause the processor to direct control signals to the actuator to dispense the thermoplastic ionomer.

In some embodiments, the thermoplastic ionomer further comprises functional nanoparticles dispersed therein, and wherein the apparatus further comprises a controller operatively coupled to the movable head, the controller having a processor and a memory, the memory having instructions stored thereon, wherein execution of the instructions, cause the processor to direct control signals i) to the second actuator to dispense the polymeric material to form a structural member and ii) to the first actuator to dispense the thermoplastic ionomer to form a sensor embedded within, and contiguous with, the structural member.

In some embodiments, the electric circuit is configured to generate an alternating current (AC) field biased with a direct current (DC).

In some embodiments, the apparatus comprises a second pair of electrodes proximately positioned relative to the chamber so as to direct a second electric field, when the electrodes are energized, thereacross or therethough. In some embodiments, each of the second pair of electrodes has a second poling length corresponding to the axis of elongation associated with the elongated chamber.

In an aspect, a workpiece is disclosed, the workpiece having a structural member formed from a polymeric material; and a sensor formed from a thermoplastic ionomer matrix comprising functional nanoparticles dispersed therein, the sensor embedded within, and contiguous with, the structural member. The workpiece can include one or more sensors integrated at predetermined locations within the structural member.

The polymeric material can comprise any suitable thermoplastic polymer. For example, the polymeric material can be a conventional thermoplastic, such as a polyacrylate (e.g., poly(methyl methacrylate) (PMMA)), acrylonitrile butadiene styrene (ABS), a polyamide (e.g., nylon), poly(lactic acid) (PLA), a polycarbonate, PEEK, a polyolefin (e.g., polyethylene, polypropylene), polystyrene, polyvinyl chloride (PVC), poly(tetrafluoroethylene) (PTFE), copolymers thereof, and blends thereof. In certain embodiments, the polymeric material can comprise a thermoplastic ionomer, as described in more detail below.

In some embodiments, the thermoplastic ionomer can comprise an ethylene copolymer ionomer. In certain embodiments, the ethylene copolymer ionomer can be derived from (i) ethylene; (ii) one or more (meth)acrylate monomers; (iii) one or more carboxylic acid-containing monomers; and (iv) optionally one or more additional ethylenically-unsaturated monomers, excluding monomers (i)-(iii). In some embodiments, the thermoplastic ionomer can comprise an ionene polymer or copolymer, such as a poly(alkylene oxide-co-ionenes) (e.g., poly(propylene glycol)-based ammonium ionenes and poly(ethylene glycol)-based ammonium ionenes) and poly(dialkyl siloxane-co-ionenes) poly(dimethyl siloxane)-based ammonium ionenes).

The functional nanoparticles can be, for example, piezoelectric particles, magnetostrictive particles, ferroelectric particles, mechanoluminescent particles, conductive particles, or a combination thereof. Appropriate functional particles can be selected to imbue the resultant ionomer-nanoparticle composite with the particular functional characteristics for a desired application (e.g., to produce a composite with desirable sensory behavior). In some embodiments, the functional nanoparticles can comprise piezoelectric nanoparticles. In some embodiments; the functional nanoparticles can comprise magnetostrictive nanoparticles. In some embodiments, the functional nanoparticles can comprise mechanoluminescent nanoparticles.

In another aspect, a method of manufacturing an object is disclosed. The method includes providing an additive manufacturing apparatus comprising: a movable head having an actuator coupled to an ejection port to regulate dispensation of a thermoplastic ionomer fed from an elongated chamber located in the movable head and coupled to the ejection port, wherein the movable printer head comprises a pair of electrodes proximately positioned relative to the chamber so as to direct an electric field, when the electrodes are energized, thereacross or therethough, each of the pair of electrodes having a length corresponding to an axis of elongation associated with the elongated chamber; and an electric circuit operatively connected to the pair of electrodes, the electric circuit being configured to generate an electric field via the pair of electrodes.

The method further includes extruding the thermoplastic ionomer from the ejection port onto a substrate, wherein the thermoplastic ionomer is subjected to inducement by the generated electric field, wherein the substrate comprises a previously extruded thermoplastic ionomer, and wherein the thermoplastic ionomer fuses with the previously extruded thermoplastic ionomer and solidifies after it has fused with the previously extruded thermoplastic ionomer.

The method further includes translocating the movable head to cause relative movement between the ejection port and the substrate as the thermoplastic ionomer is extruded from the ejection port.

In some embodiments, the object is manufactured by extruding the thermoplastic ionomer onto selected parts of the substrate in a series of layers in accordance with a three-dimensional model of the object.

In some embodiments, the thermoplastic ionomer can comprise an ethylene copolymer ionomer. In certain embodiments, the ethylene copolymer ionomer can be derived from (i) ethylene; (ii) one or more (meth)acrylate monomers; (iii) one or more carboxylic acid-containing monomers; and (iv) optionally one or more additional ethylenically-unsaturated monomers, excluding monomers (i)-(iii). In some embodiments, the thermoplastic ionomer can comprise an ionene polymer or copolymer, such as a poly(alkylene oxide-co-ionenes) (e.g., poly(propylene glycol)-based ammonium ionenes and polyethylene glycol)-based ammonium ionenes) and poly(dialkyl siloxane-co-ionenes) (e.g., poly(dimethyl siloxane)-based ammonium ionenes).

The functional nanoparticles can be, for example, piezoelectric particles, magnetostrictive particles, ferroelectric particles, mechanoluminescent particles, conductive particles, or a combination thereof. Appropriate functional particles can be selected to imbue the resultant ionomer-nanoparticle composite with the particular functional characteristics for a desired application (e.g., to produce a composite with desirable sensory behavior). In some embodiments, the functional nanoparticles can comprise piezoelectric nanoparticles. In some embodiments, the functional nanoparticles can comprise magnetostrictive nanoparticles. In some embodiments, the functional nanoparticles can comprise mechanoluminescent nanoparticles.

In certain embodiments, the functional nanoparticles comprise piezoelectric nanoparticles, and the electric circuit is configured to generate a poling voltage.

In another aspect, a method of validating a finite element design of a structural component is disclosed. The method includes fabricating, by an additive manufacturing apparatus, a workpiece from a CAD model, wherein the workpiece comprises an ionomer matrix comprising mechanoluminescent particles dispersed therein; subjecting, via a mechanical test system, the workpiece to a stress or strain test; capturing, via an imaging system, one or more images of the electromagnetic radiation emitted by the mechanoluminescent particles in response to the stress or strain test; and comparing, via a processor; the one or more captured images having stressed or strain patterns on the workpiece to a computationally-derived stressed or strain patterns generated from the CAD model.

In some embodiments, the computationally-derived stressed or strain patterns are generated from a finite element analysis.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE FIGURES

The accompanying drawings, which are incorporated in and constitute a part of this specification, illustrate embodiments and together with the description, serve to explain the principles of the methods and systems.

DETAILED SPECIFICATION

Figure 1:
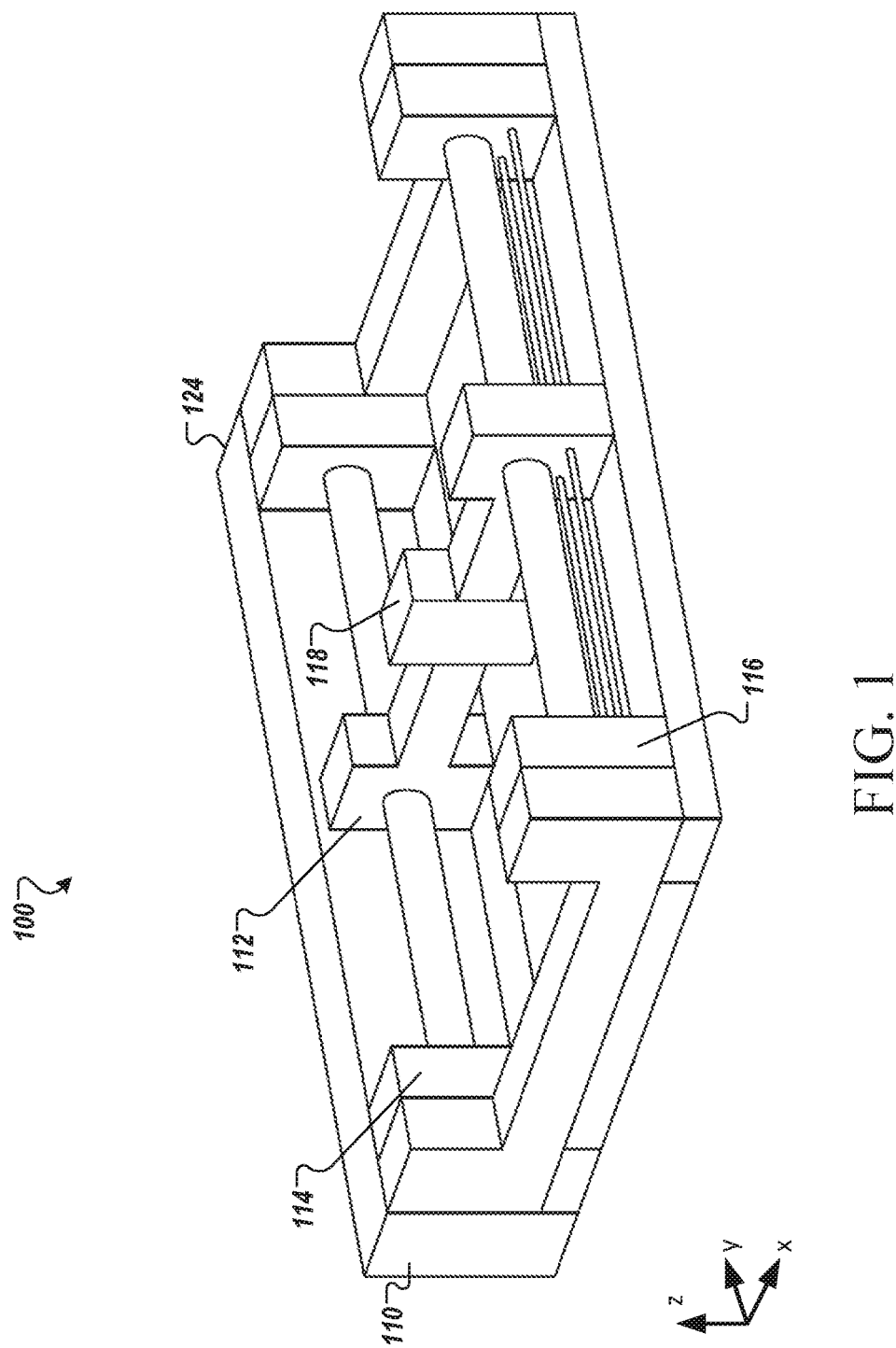
FIG. 1 depicts a diagram of an additive manufacturing apparatus configured to contemporaneously fabricate a structural component with an embedded sensor element in accordance with an illustrative embodiment.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Smart Structural Composites

Exemplified additive manufacturing technique enables the fabrication of structural composites with embedded smart material components. Rather than fabricating multi-functional structure, having smart material actuators and sensors, independent of the structural components, the exemplified technology enables the rapid prototyping of sensor components and structural components contemporaneously on a layer-by-layer basis. The technique uses thermal processing of polymeric substrates and nanophase smart materials that thus produces seamless three-dimensional (3D) composites with intrinsic actuation and sensing properties in which the resulting multi-functional structure is fabricated from a single manufacturing step.

Smart materials are a unique category of materials that have transformed the design and development of automated systems. Examples of smart materials include, but not limited to piezoelectric materials, magnetostrictive materials, and electroactive polymers. These materials are ubiquitous in engineered systems and are indispensable as sensors, actuators and energy harvesting systems. The exemplified rapid prototyping process enables the fabrication of aerospace control surfaces, automotive body panels, and self-sensing actuators, among other workpieces.

Addictive Manufacturing Apparatus

FIG. 1 depicts a diagram of an additive manufacturing apparatus 100 configured to contemporaneously fabricate a structural component with an embedded sensor element in accordance with an illustrative embodiment. The apparatus 100 includes, in some embodiments, a linearly actuated assembly driven by motors in an X, Y, and Z axis plane. As shown, the apparatus 100 includes a frame 110 having mounted an X-axis drive 112, a Y-axis drive 114, and a Z-axis drive 116. The apparatus 100 includes a movable printing head 118 (also referred to as an extruder nozzle 118) mounted to the drives. The movable printing head 118 linearly moves, in the X, Y, and Z axis, while dispensing a polymer (e.g., a thermoplastic ionomer) to form a workpiece 122 (see FIG. 2) in successive layers. The moveable printer head 118 includes one or more ejection ports to eject one or more materials. The moveable printer head 118 includes electrodes to generate an electric field to induce orientation of at least one of the materials (e.g., piezoelectric materials, magnetostrictive materials, ferroelectric materials, and electroactive polymers) to be dispensed by the printer head. The apparatus 100 includes an electric circuit to energize the electrodes. One or more controllers 124 control the motion of the linear motors and actuators, the dispensation of the polymer, and the electric circuit.

Figure 2:
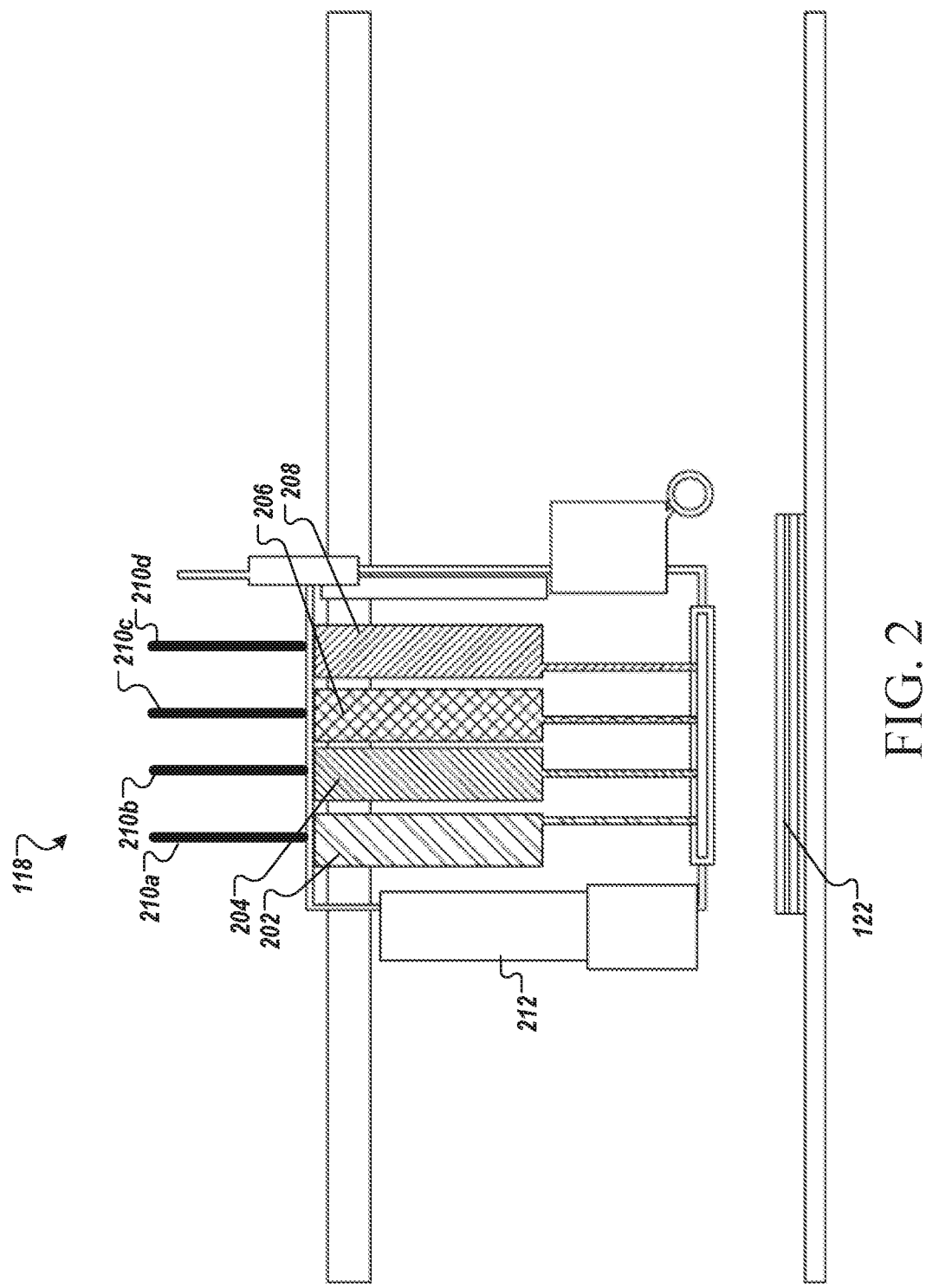
FIG. 2 depicts a diagram of a movable head of the additive manufacturing apparatus of FIG. 1 in accordance with an illustrative embodiment.

FIG. 2 depicts a diagram of the movable printer head 118 of the additive manufacturing apparatus 100 of FIG. 1 in accordance with an illustrative embodiment. The movable printer head 118 includes a plurality of piezoelectric head subassemblies (shown as 202, 204, 206, and 208), each configured to house and eject a polymer therefrom. Each of the piezoelectric head subassemblies receives a polymer feed from a slurry delivery line (shown as 210a, 210b, 210c, and 210d). In this arrangement, each individual head subassembly may be used to deposit a different material.

In some embodiments, each head subassembly may be used to deposit the same material (e.g., thermoplastic ionomer) which varies the concentrations of dispersed functional nanoparticles. In this manner, the apparatus may be used to fabricate a workpiece that has varying-gradients or transition regions of functional nanoparticles.

The thermoplastic polymer can comprise a thermoplastic ionomer. Any suitable thermoplastic ionomer can be used. For example, the ionomer can include at least one of a polyolefin, polyamide, polyester, ionene, poly(trimethylene terephthalate), copoly(ether-ester copoly(ester-ester), polyamide, polyether, copoly(urethane-ester), copoly(urethane-ether), polyacrylate, polystyrene, styrene-butadiene-styrene copolymer, styrene-ethylene-butylene-styrene copolymer, polypropylene, ethyl ene-propyl ene-diene terpolymer or ethylene-propylene copolymer rubber, and a polycarbonate, or a homopolymer, copolymer, block copolymer, or a mixture thereof.

In some embodiments, the thermoplastic ionomer can comprise an ethylene copolymer ionomer. Suitable ethylene copolymer ionomers can be copolymers of ethylene; a carboxylic acid-containing monomer, such as a C3 to C12 (e.g., a C3 to C8, or a C3 to C6) α, β-ethylenically unsaturated mono- or dicarboxylic acid; and optionally a softening monomer. Copolymers may include, without limitation, ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl(meth)acrylate, ethylene/(meth)acrylic acid/isobutyl(meth)acrylate, ethylene/(meth)acrylic acid/methyl(meth)acrylate, ethylene/(meth)acrylic acid/ethyl(meth)acrylate terpolymers, and the like. The term, "copolymer," as used herein, includes polymers having two types of monomers, those having three types of monomers, and those having more than three types of monomers. Examples of suitable α,β-ethylenically unsaturated mono- or dicarboxylic acids include (meth)acrylic acid, ethacrylic acid, maleic acid, crotonic acid, fumaric acid, itaconic acid. As used herein, "(meth)acrylic acid" means meth)acrylic acid and/or acrylic acid. Likewise, "(meth)acrylate" means methacrylate and/or acrylate.

When a softening monomer is present, such copolymers can be referred to as E/X/Y-type copolymers, wherein E is ethylene; X is a carboxylic acid-containing monomer, such as a C3 to C12 (e.g., a C3 to C8, or a C3 to C6) α,β-ethylenically unsaturated mono- or dicarboxylic acid; and Y is a softening monomer. The softening monomer can be, for example, a (meth)acrylate monomer, such as an alkyl(meth)acrylate monomer wherein the alkyl group has from 1 to 12 carbon atoms (e.g., from 1 to 8 carbon atoms, from 1 to 6 carbon atoms, or from 1 to 4 carbon atoms). Optionally, such polymers can optionally further include one or more additional ethylenically-unsaturated monomers. Examples of E/X/Y-type copolymers are those wherein X is (meth)acrylic acid and/or Y is selected from (meth)acrylate, n-butyl(meth)acrylate, isobutyl(meth)acrylate, methyl(meth)acrylate, and ethyl(meth)acrylate. In certain cases, the E/X/Y-type copolymer can be ethylene/(meth)acrylic acid/n-butyl acrylate, ethylene/(meth)acrylic acid/methyl acrylate, and ethylene/acrylic acid/ethyl acrylate.

The amount of ethylene in the acid copolymer can be at least 15 wt. % (e.g., at least 25 wt. %, at least 40 wt. %, or at least 60 wt. %), based on total weight of the monomers used to form the copolymer. The amount of carboxylic acid-containing monomer, such as a C3 to C12 (e.g., a C3 to C8, or a C3 to C6) α,β-ethylenically unsaturated mono- or dicarboxylic acid can be from 1 wt. % to 35 wt. % (e.g., from 5 wt. % to 30 wt. %, from 5 wt. % to 25 wt. %, or from 10 wt. % to 20 wt. %), based on total weight of the monomers used to form the copolymer. The amount of optional softening comonomer in the copolymer can be from 0 wt. % to 50 wt. % (e.g., from 5 wt. % to 40 wt. %, from 10 wt. % to 35 wt. %, or from 20 wt. % to 30 wt. %), based on total weight of the monomers used to form the copolymer based on total weight of the monomers used to form the copolymer. "Low acid" and "high acid" ionomeric polymers, as well as blends of such ionomers, can also be used. In general, low acid ionomers are considered to be those containing 16 wt. % or less of acid moieties, whereas high acid ionomers are considered to be those containing greater than 16 wt. % of acid moieties.

The acidic groups in the ionomers can be partially or totally neutralized with a cation source. Suitable cation sources include metal cations and salts thereof, organic amine compounds, ammonium, and combinations thereof. Examples of cation sources include metal cations and salts thereof, wherein the metal is can be lithium, sodium, potassium, magnesium, calcium, barium, lead, tin, zinc, aluminum, manganese, nickel, chromium, copper, or a combination thereof. The metal cation salts provide the cations capable of neutralizing (at varying levels) the carboxylic acids of the ethylene acid copolymer and fatty acids, if present, as discussed further below. These include, for example, the sulfate, carbonate, acetate, oxide, or hydroxide salts of lithium, sodium, potassium, magnesium, calcium, barium, lead, tin, zinc, aluminum, manganese, nickel, chromium, copper, or a combination thereof. In certain embodiments, the metal cation salts can be calcium and magnesium-based salts. High surface area cation particles such as micro and nano-scale cation particles can be desirable in certain circumstances. The amount of cation used in the composition is readily determined based on desired level of neutralization.

In certain embodiments, the ethylene copolymer ionomer can be derived from (i) ethylene; (ii) one or more (meth)acrylate monomers; (iii) one or more carboxylic acid-containing monomers; and (iv) optionally one or more additional ethylenically-unsaturated monomers, excluding monomers (i)-(iii). In some embodiments, the thermoplastic ionomer can comprise an ionene polymer or copolymer, such as a poly(alkylene oxide-co-ionenes) (e.g., poly(propylene glycol)-based ammonium ionenes and poly(ethylene glycol)-based ammonium ionenes) and poly(dialkyl siloxane-co-ionenes) (e.g., poly(dimethyl siloxane)-based ammonium ionenes).

The functional nanoparticles can be, for example, piezoelectric particles, magnetostrictive particles, ferroelectric particles, mechanoluminescent particles, conductive particles, or a combination thereof. Appropriate functional particles can be selected to imbue the resultant ionomer-nanoparticle composite with the particular functional characteristics for a desired application (e.g., to produce a composite with desirable sensory behavior).

In some embodiments, the functional nanoparticles can comprise piezoelectric nanoparticles PVDF, PZT, BaTiO3, or combinations thereof). In some embodiments, the functional nanoparticles can comprise magnetostrictive nanoparticles (e.g., Terfenol-D). In some embodiments, the functional nanoparticles can comprise mechanoluminescent nanoparticles (e.g., ZnS:Mn; $SrAl_2O_4$:Eu(SAOE); $SrAl_2O_4$: Eu,Dy(SAOED); $SrAl_2O_4$:Ce; $SrAl_2O_4$:Ce,Ho; $SrMgAl_6O_n$:Eu; $SrCaMgSi_2O_7$:Eu; $Sr_2MgSi_2O_7$:Eu; $Ca_2MgSi_2O_7$:Eu,Dy; $CaYAl_3O_7$:Eu; $Ca_2Al_3SiO_7$:Ce; and combinations thereof). In some embodiments, the functional nanoparticles comprise piezoelectric nanoparticles, and the electric circuit is configured to generate a poling voltage. In these embodiments, the applied electric field can function to pole the piezoelectric material concurrent with deposition of the ionomer-nanoparticle composite.

Referring still of FIG. 1, the movable printer head 118 is movably coupled to a guide rail that drives its motion along one of the axis.

The movable printer head 118, in some embodiments, includes a curing station or IR source 212. The curing station or IR source 212 treats either the polymeric substrates, nanophase smart materials, or combinations thereof to cause such materials to set.

In addition, the movable printer head 118, in some embodiments, includes a heater 214. In some embodiments, the heater 214 is a LASER-based heating member (e.g., a UV-laser) that spans the printer head 118. The LASER-based heating member, in some embodiments, is used to cure a dispensed resin and solidify a pattern aced therein.

The movable printer head 118 includes a driver stage circuit that controls actuation of the piezoelectric heads.

The movable printer head includes an ejection port that regulates dispensation of a material (e.g., a thermoplastic ionomer), which is fed from a chamber located in the movable head 118 and coupled to the ejection port. The movable printer head further includes a pair of electrodes proximately positioned relative to the chamber so as to direct an electric field, when the electrodes 304 are energized, thereacross or therethough. The generated electric field induces the material (e.g., polymeric components of the thermoplastic ionomer) to orient in a pre-defined direction as the material is fed through, and along, a channel in the printer head to the ejection port. Each of the pair of electrodes has a length along which the electric field is applied when the material moves through the movable printer head.

The electric circuit operatively connects to the pair of electrodes 304 to produce, in some embodiments, a poling electric potential having a magnitude sufficient to induce poling of the thermoset ionomer.

Figure 3:
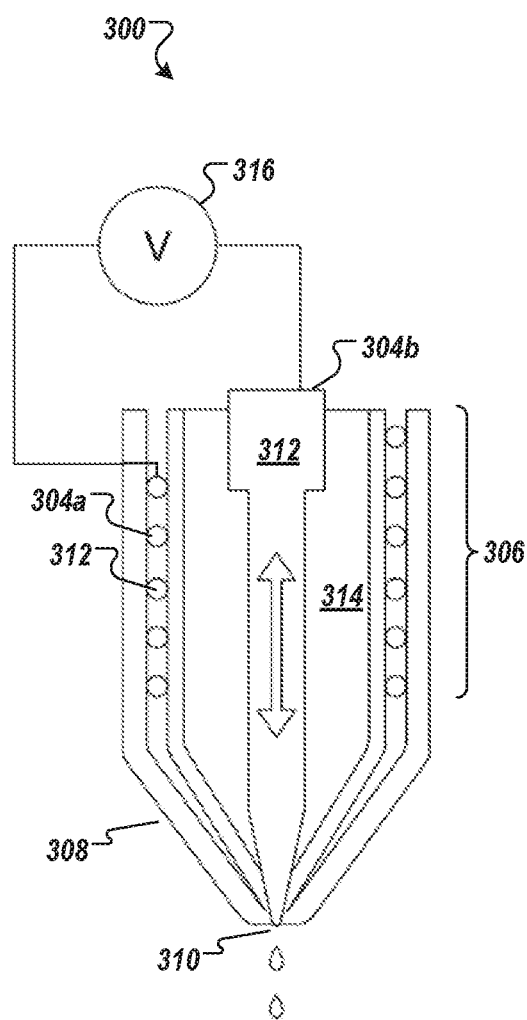
FIGS. 3-5, comprising FIGS. 3, 4, and 5, each depicts a diagram of an ejection port of the movable head of FIG. 2 in accordance with an illustrative embodiment.
Figure 4:
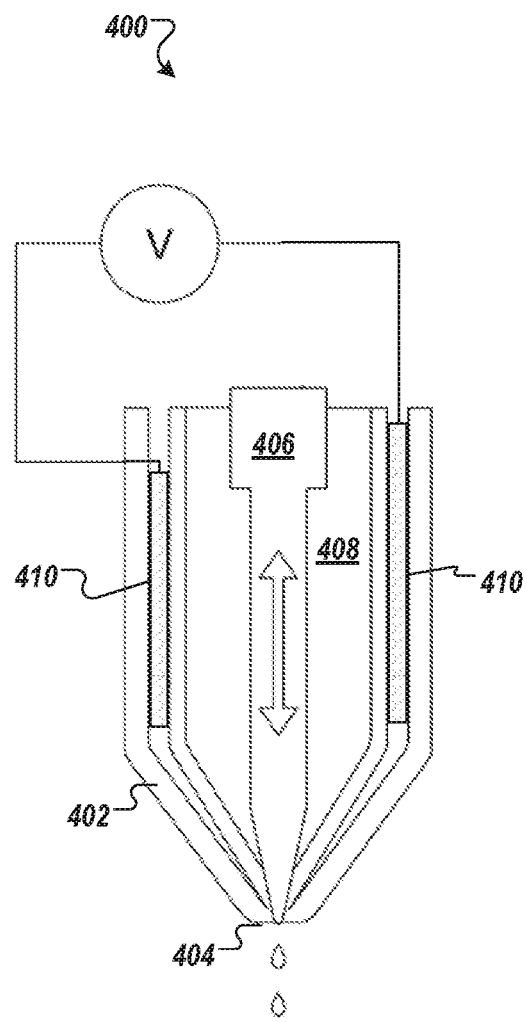
Figure 5:
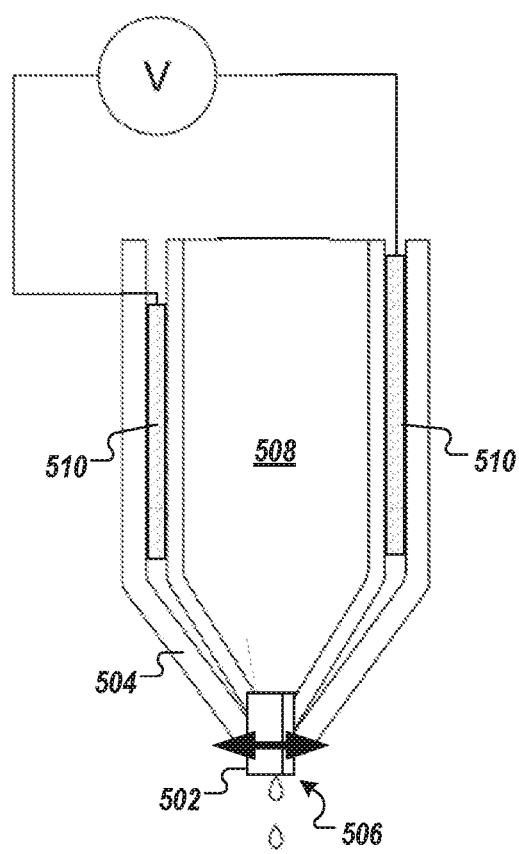

FIGS. 3-5, comprising FIGS. 3, 4, and 5, each depicts a diagram of an ejection port of the movable head of FIG. 2 in accordance with an illustrative embodiment.

FIG. 3 depicts a diagram of an ejection port 300 configured with a reciprocating needle that serves as an electrode 304. As shown in FIG. 3, the ejection port 300 includes a nozzle 308 that terminates at an opening 310. The nozzle 308 forms an outer shell that houses a coil 312 which serves as a first electrode 304a. The nozzle 302 surrounds a reciprocating needle 312 which serves as the second electrodes 304b The reciprocating needle 312 is electrically driven, by an actuator (e.g., a piezoelectric device) to controllable move between a dispensing position and a closed position, to regulate the dispensation of the material in the chamber 314 through the opening 310. In some embodiments, the actuator is disposed in the printer head 118.

The electrodes are coupled to an electrical source 316 (e.g., a power circuit). Suitable filters and signal conditioning circuits may be used to condition outputs, of a voltage or current source, to the electrodes.

FIG. 4 depicts a diagram of an ejection port 400 configured with a reciprocating needle that operates in conjunction with a pair of electrodes. As shown in FIG. 4, the ejection port 400 includes a nozzle 402 that terminates at an opening 404. The nozzle 402 surrounds a reciprocating needle 406 that regulates the dispensation of the material in the chamber 408 through the opening 402. The nozzle 402 includes a pair of electrodes 410, each of which is shaped as a plate (e.g., a curved plate or a planar plate). The plates are offset from one another to define a region to which an electric field is generated therebetween. The plate may be curved, straight, or shaped to generate a specific electric field shape.

FIG. 5 depicts a diagram of an ejection port 500 configured with a piezoelectric actuator 502 that operates in conjunction with a pair of electrodes. As shown in FIG. 5, the ejection port 500 includes a nozzle 504 that terminates at an opening 506. The nozzle 502 includes the piezoelectric actuator 502 which is electrically and controllably driven to move, between a dispensing position and a closed position, to regulate dispensation of the material in the chamber 508 through the opening 506. The nozzle 504 includes a pair of electrodes 510, each of which is shaped as a plate (e.g., curved plate or a planar plate). The plates are offset from one another to define a region to which an electric field is generated therebetween. The plate may be curved, straight, or shaped to generate a specific electric field shape.

Controls of Electric Field

Figure 6:
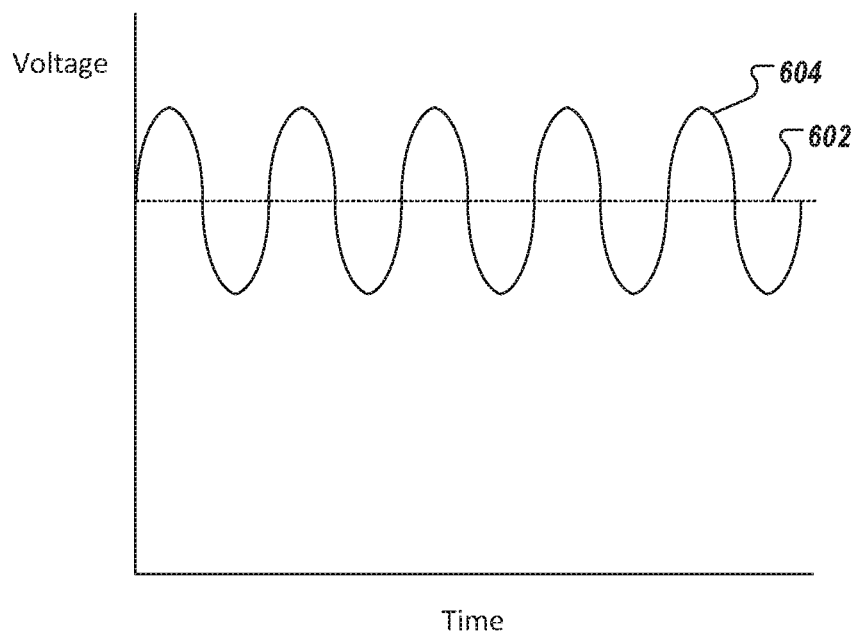
FIG. 6 illustrates an example output of the electric circuit to induce the DC field biased with AC field component.

In some embodiments, to reduce and/or prevent the build-up of ionized materials around the electrodes or surfaces, the control system is configured to output an electric field that promotes alternating motion of the material. In some embodiments, the control system is configured to output an alternative-current (AC) field that is biased onto a direct-current (DC) field. FIG. 6 illustrates an example voltage output of the electric circuit to induce the DC field biased with AC component. As shown in FIG. 6, a DC voltage 602 is applied to the electrodes of the movable printer head. A secondary AC voltage 604 is biased on the DC voltage 602.

Without wishing to be bound to a particular theory, the DC field induces a static electric field over a pre-defined region in the nozzle area of the printer head. This static electric field induces the materials in the pre-defined region to be oriented in a particular orientation. The AC field induces vibrational movements of the materials oriented to a given direction.

Workpiece

Figure 7:
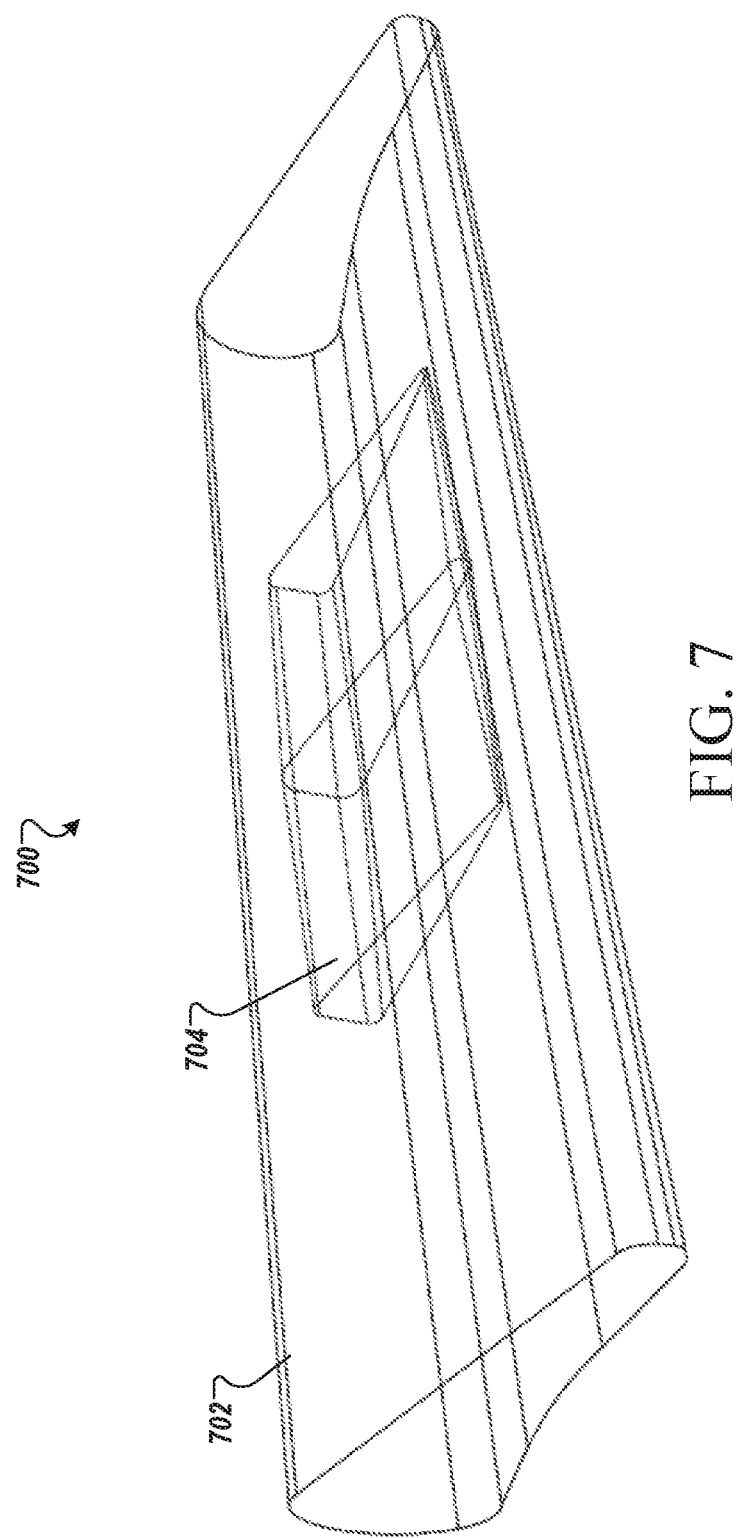
FIG. 7 depicts a diagram of a workpiece fabricated with the additive manufacturing apparatus disclosed herein, in accordance with an illustrative embodiment.

FIG. 7 depicts a diagram of a workpiece 700 fabricated with the additive manufacturing apparatus disclosed herein, in accordance with an illustrative embodiment. The workpiece 700 includes a composite control surface 702 formed as an ionomer matrix. Matrix 702 includes an embedded piezoelectric actuator 704. The piezoelectric actuator 704 may include varying-gradient or transition regions of functional nanoparticles.

Process to Manufacture

Figure 8:
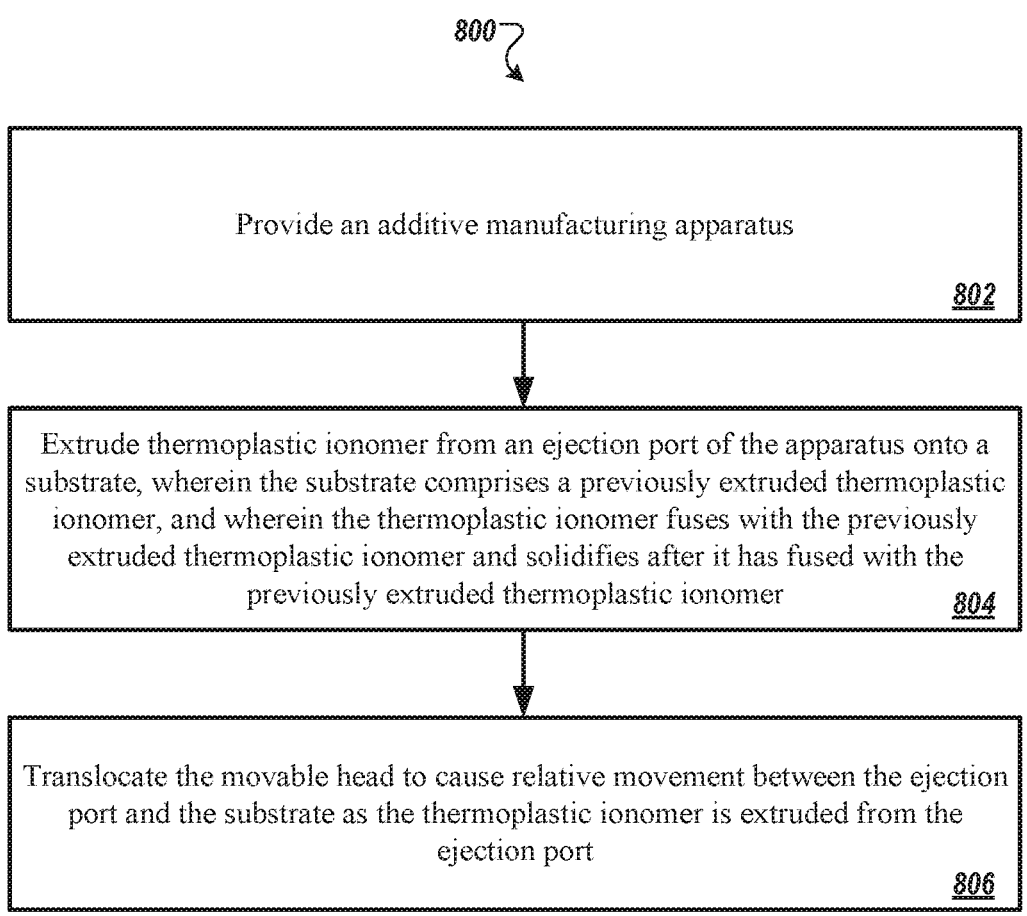
FIG. 8 depicts a flow diagram of a method of manufacturing an object in accordance with an illustrative embodiment.

FIG. 8 depicts a flow diagram of a method 800 of manufacturing an object in accordance with an illustrative embodiment. The method 800 includes providing an additive manufacturing apparatus 100 (step 802). The apparatus 100, in some embodiments, includes a movable printer head 118 having an actuator (e.g., 312, 406; or 502) coupled to an ejection port (e.g., 310, 404, or 506) to regulate dispensation of a thermoplastic ionomer fed from an elongated chamber located in the movable head 118 and coupled to the ejection port (e.g., 310, 404, or 506), wherein the movable printer head 118 comprises a pair of electrodes 304a, 304b proximately positioned relative to the chamber so as to direct an electric field, when the electrodes are energized, thereacross or therethough. Each of the pair of electrodes 304a, 304b has a length 306 corresponding to an axis of elongation associated with the elongated chamber; and an electric circuit (e.g., 124) operatively connected to the pair of electrodes 304a, 304b. The electric circuit is configured to generate an electric field via the pair of electrodes.

The method 800 includes extruding the thermoplastic ionomer from the ejection port onto a substrate (step 804), wherein the thermoplastic ionomer is subjected to inducement by the generated electric field, wherein the substrate comprises a previously extruded thermoplastic ionomer, and wherein the thermoplastic ionomer fuses with the previously extruded thermoplastic ionomer and solidifies after it has fused with the previously extruded thermoplastic ionomer.

The method 800 includes translocating the movable head 118 to cause relative movement between the ejection port and the substrate as the thermoplastic ionomer is extruded from the ejection port (step 806). The movable head 118 may be moved, in some embodiments, by linearly controlled actuators as described in relation to FIG. 1.

Process to Validate Finite Element Design of a Structural Component

Figure 9:
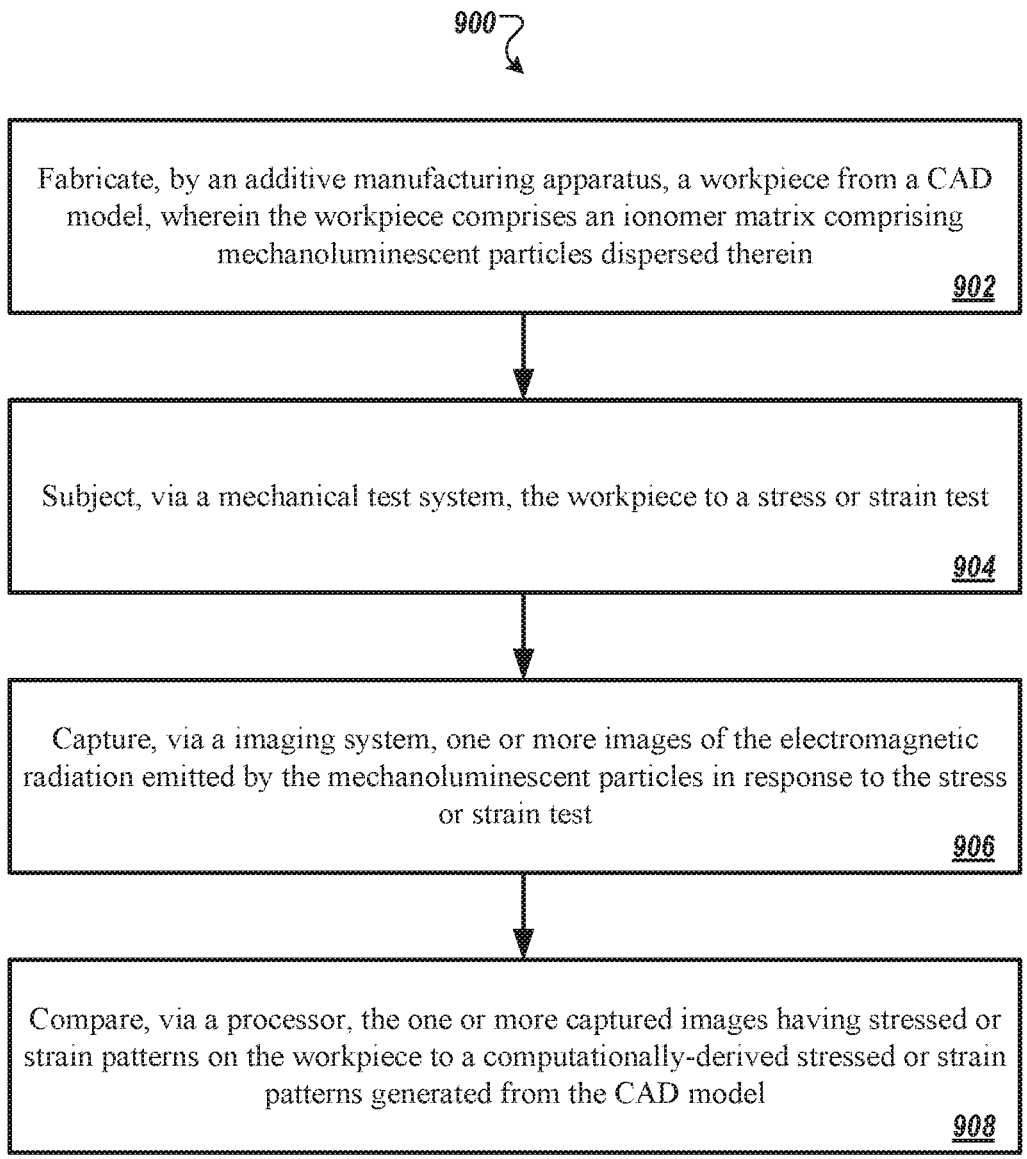
FIG. 9 depicts a flow diagram of a method of validating a finite element design of a structural component in accordance with an illustrative embodiment.

FIG. 9 depicts a flow diagram of a method 900 of validating a finite element design of a structural component in accordance with an illustrative embodiment. The method 900 includes fabricating, by an additive manufacturing apparatus, a workpiece from a CAD model, wherein the workpiece comprises an ionomer matrix comprising mechanoluminescent particles dispersed therein (step 902).

The method 900 includes subjecting, via a mechanical test system, the workpiece to a stress or strain test (step 904). Examples of mechanical test systems includes, but are not limited to, mechanical testing equipment, material testing equipment, fatigue testing equipment, tensile testing equipment, as well as motion simulation and calibration equipment. In some embodiments, mechanical test systems include wind tunnels, thermal chambers, and various stress/strain inducing test chambers.

The method 900 includes capturing, via an imaging system, one or more images of the electromagnetic radiation emitted by the mechanoluminescent particles in response to the stress or strain test (step 906). In some embodiments, the electromagnetic radiation may be emitted by exposure of the mechanoluminescent particles to ultra-violet light.

The method 900 includes comparing, via a processor, the one or more captured images having stressed or strain patterns on the workpiece to a computationally-derived stressed or strain patterns generated from the CAD model (step 908). The images are captured, in some embodiments, while the workpiece is subjected to a mechanical, thermal, or electrical load or force.

Figure 10:
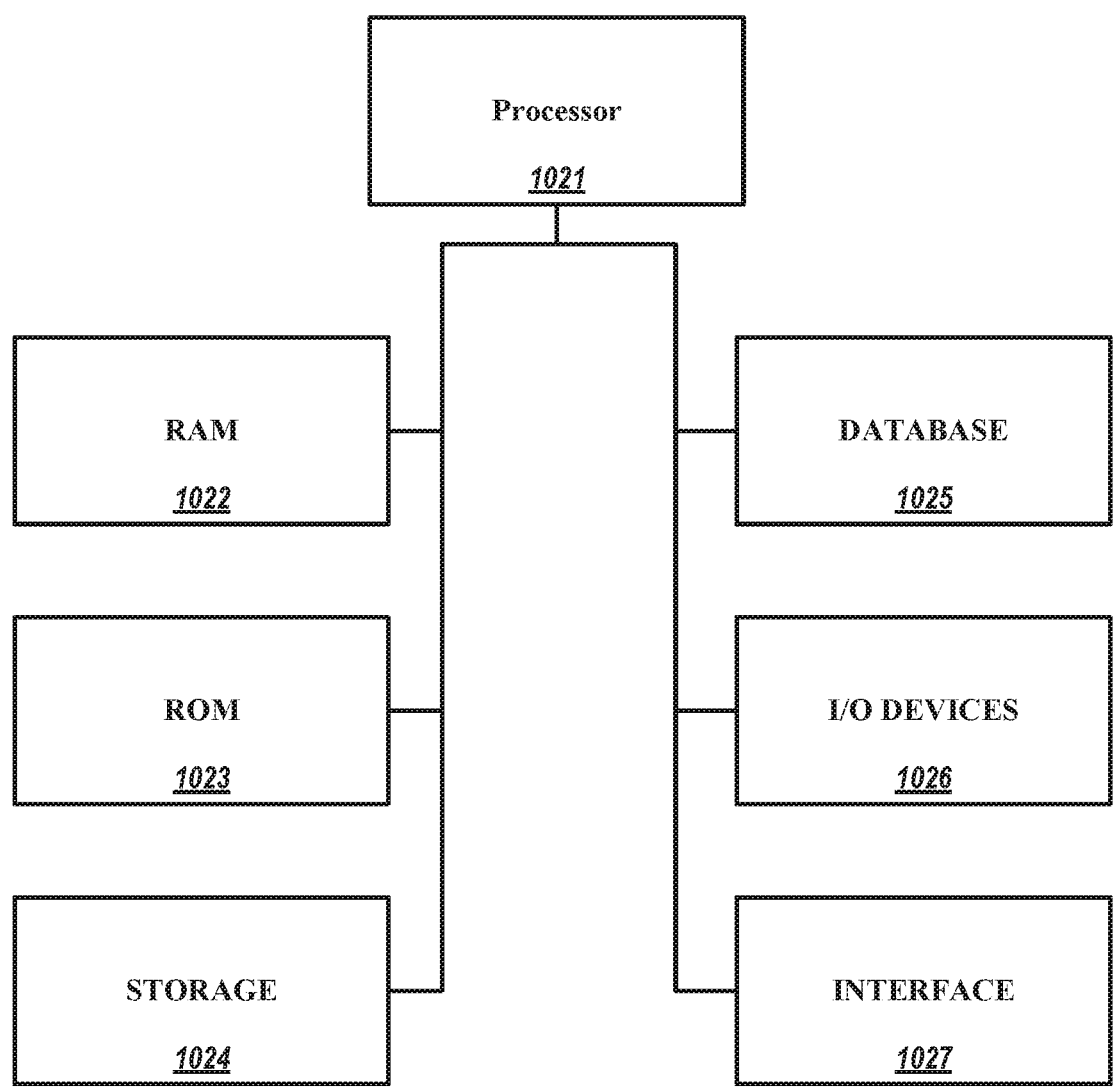
FIG. 10 depicts a diagram of an exemplary computer that can be used for contemporaneously fabricating a structural component with embedded sensor elements.

FIG. 10 depicts a diagram of an exemplary computer that can be used for contemporaneously fabricating a structural component with an embedded sensor elements. In various aspects, the computer of FIG. 10 may comprise all or a portion of the additive manufacturing apparatus, as described herein. As used herein, "computer" may include a plurality of computers. The computers may include one or more hardware components such as, for example, a processor 1021, a random access memory (RAM) module 1022, a read-only memory (ROM) module 1023, a storage 1024, a database 1025, one or more input/output (I/O) devices 1026, and an interface 1027. Alternatively and/or additionally, controller 1020 may include one or more software components such as, for example, a computer-readable medium including computer executable instructions for performing a method associated with the exemplary embodiments. It is contemplated that one or more of the hardware components listed above may be implemented using software. For example, storage 1024 may include a software partition associated with one or more other hardware components. It is understood that the components listed above are exemplary only and not intended to be limiting.

Processor 1021 may include one or more processors, each configured to execute instructions and process data to perform one or more functions associated with a computer for indexing images. Processor 1021 may be communicatively coupled to RAM 1022, ROM 1023, storage 1024, database 1025, I/O devices 1026, and interface 1027. Processor 1021 may be configured to execute sequences of computer program instructions to perform various processes. The computer program instructions may be loaded into RAM 1022 for execution by processor 1021.

RAM 1022 and ROM 1023 may each include one or more devices for storing information associated with operation of processor 1021. For example, ROM 1023 may include a memory device configured to access and store information associated with controller 1020, including information for identifying, initializing, and monitoring the operation of one or more components and subsystems. RAM 1022 may include a memory device for storing data associated with one or more operations of processor 1021. For example, ROM 1023 may load instructions into RAM 1022 for execution by processor 1021.

Storage 1024 may include any type of mass storage device configured to store information that processor 1021 may need to perform processes consistent with the disclosed embodiments. For example, storage 1024 may include one or more magnetic and/or optical disk devices, such as hard drives, CD-ROMs, DVD-ROMs, or any other type of mass media device.

Database 1025 may include one or more software and/or hardware components that cooperate to store, organize, sort, filter, and/or arrange data used by controller 1020 and/or processor 1021. For example, database 1025 may store the computational models, e.g., finite elements analysis (FEA) models, for a given structural design and corresponding load measurements derived from a workpiece of the structural design fabricated with the additive manufacturing apparatus disclosed herein. It is contemplated that database 1025 may store additional and/or different information than that listed above.

I/O devices 1026 may include one or more components configured to communicate information with a user associated with controller 1020. For example, I/O devices may include a console with an integrated keyboard and mouse to allow a user to maintain a database of images, update associations, and access digital content. I/O devices 1026 may also include a display including a graphical user interface (GUI) for outputting information on a monitor. 110 devices 1026 may also include peripheral devices such as, for example, a printer for printing information associated with controller 1020, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 1027 may include one or more components configured to transmit and receive data via a communication network, such as the Internet, a local area network, a workstation peer-to-peer network, a direct link network, a wireless network, or any other suitable communication platform. For example, interface 1027 may include one or more modulators, demodulators, multiplexers, demultiplexers, network communication devices, wireless devices, antennas, modems, and any other type of device configured to enable data communication via a communication network.

By way of non-limiting illustration, examples of certain embodiments of the present disclosure are given below.

EXAMPLES

Overview

Investigated herein are additive manufacturing methods that can be used to prepare seamless smart polymer composites. The composites can include smart materials (e.g., nanophase smart materials, including functional nanoparticles, such as piezoelectric nanoparticles and/or mechanoluminescent nanoparticles, dispersed in a thermoplastic ionomer matrix) that can be configured to perform actuation, sensing, and/or energy harvesting functions. Thermoplastic ionomers contain ionic groups that aggregate together below the ionomer's glass transition temperature (Tg). By cycling the temperature of the ionomer from room temperature to above glass transition temperature of the ionomer, the ionic groups can be reversibly rearranged in the polymer. The reversibility of this transition can be exploited, for example, to design self-healing materials.

Herein, additive manufacturing techniques that exploit the thermoelectric processing of structural thermoplastic ionomers (polymers) are proposed. In certain cases, the thermoelectric processing of thermoplastic ionomers having a nanoparticulate smart material (e.g., piezoelectric nanoparticles, mechanoluminescent particles, magnetostrictive particles, ferroelectric particles, and/or conductive particles) dispersed therein can be used to form stimuli-responsive smart materials (e.g., sensors) by additive manufacturing (3D-printing) techniques.

In the case of the thermoelectric processing of thermoplastic ionomers having piezoelectric nanoparticles dispersed therein, thermoelectric processing can improve the precision of the deposition of the thermoplastic ionomer matrix while the applied electric field can simultaneously pole the nanophase piezoelectric components dispersed therein. Using this deposition approach, active piezoelectric components (e.g., sensors) can be directly fabricated using an FDM-type 3D-printing process.

In other cases, an electric field is generated to control the formation and size of ionic aggregates in thermoplastic ionomers, allowing for the control of interfacial adhesion. Accordingly, the thermoelectric processing of thermoplastic ionomers can exploit the electric field-driven formation of ionic aggregates in thermoplastic ionomers above glass transition temperature to improve control over the deposition of thermoplastic ionomers in fused deposition modeling-type (FDM-type) 3D-printing processes.

Using current fabrication techniques, the integration of sensors within structural components can be difficult or impossible. However, the thermoelectric processing techniques can provide avenues to produce structural composites having smart materials (e.g., sensors) integrated within the structural composite in a single manufacturing step.

Introduction

Smart materials are a unique category of materials that have transformed the design and development of automated systems. Examples of s materials include, but are not limited to, piezoelectric materials, magnetostrictive materials, ferroelectric materials, and electroactive polymers. These materials are ubiquitous in engineered systems, and are indispensable as sensors and actuators. In addition, there is significant research interest in the development of energy harvesting systems using smart materials in the past two decades for powering autonomous systems.

Despite the widespread use and system-level advantages of smart materials, there are relatively few manufacturing techniques allow for the incorporation of smart materials into structural components. Rather, current methods generally involve fabricating smart material actuators and sensors independent of the structural components, and subsequent assembly by fasteners or by an interference fit. While this approach can be sufficient for many research and non-structural applications, such approaches represent a significant obstacle in the design of structural components containing integrated sensors (e.g., aerospace control surfaces, automotive body panels, and self-sensing actuators).

To facilitate the incorporation of smart materials into structural components, nanophase smart material can be dispersed in a polymeric matrix with a gradual variation of component composition at the interface to minimize discontinuity in the mechanical properties of the structural component while still imparting functionality. In the design of magnetostrictive multifunctional structural composites, this approach can lead to robust actuators and sensors. In the case of piezoelectric multifunctional structural composites, an additional layer of electrode material can be added at the interfacial region to provide electrical access to the smart material constituent for the fabrication of a robust actuator or sensor.

The resins or polymers used in standard rapid prototyping methods require temperatures that are sufficiently high to affect the functional properties of smart material constituents. To overcome this technical obstacle, smart material composites based on thermoplastic ionomers may be employed. Ionomers are a category of polymers that contain a small fraction of charged groups. These charged groups and their counterions induce the formation of ionic aggregates in the polymer at temperatures below melting temperature (Tm). By increasing the temperature above Tm (melt temperature), the polymer softens due to effective weakening of the forces that bind these ionic aggregates. The temperature required to process many ionomers, including poly(ethylene-co-methacrylic acid) (commercially available from DuPont under the trade name SURLYN®), are low enough to render these ionomers compatible with most smart material components. Further, the charged groups in the ionomer can promote better adhesion of the polymer to the particulate phase. Due to the charges, it is anticipated that control of electrostatic fields can regulate the distribution and number of polymer molecules involved in each aggregate.

Nanophase smart materials, especially ferroelectric and magnetostrictive materials, exhibit advantageous functional and mechanical properties relative to bulk materials. Despite these functional advantages of nanophase piezoelectric and magnetoelectric materials, only ad-hoc methods of incorporating these nanophase smart materials into structural materials exist. Further, there are no rapid prototyping techniques currently available to fabricate graded multifunctional structural composites from a CAD model. The systems and methods for the fabrication of graded smart material compositions described herein can be used, for example, to form electromechanical actuators, advanced sensors, and energy harvesting platforms, for example, in automotive and aerospace applications Thermoplastic Ionomers While any thermoplastic ionomer can in principle be suitable for use in conjunction with the methods described herein, poly(ethylene-co-methacrylic acid) (commercially available from DuPont under the trade name SURLYN®) was selected for proof-of-principle studies. SURLYN® is an amorphous copolymer of ethylene/methacrylic acid (E/MAA) that is partially neutralized with sodium ions. It has a well-defined melt temperature and can be thermally cycled 100× before the onset of polymer degradation. It is commercially available from DuPont™ as pellets in which methacrylic acid is partially neutralized by lithium, sodium, magnesium, or zinc. Due to its commercial availability, the resulting knowledge from this work can be translated to a bench top prototype for additive manufacturing to produce low-volume and low-cost smart structural composites. However, the concepts described herein be extended to other ion-containing polymers, such as ionenes.

When comparing the mechanical properties of SURLYN® with various commercially available polymers for additive processing (e.g., acrylic- and epoxy-based resins, PA12, ABS, PC, ABS-PC blend, PPSU, and polyjet), one observed that SURLYN® has a comparable tensile strength and is relatively more ductile than aforementioned materials in its virgin form. Hence, the addition of micro- or nanoscale constituents with the SURLYN® will result in a composite material that is less plastic and exhibits a higher tensile strength than SURLYN®. This makes SURLYN® an excellent candidate for the fabrication of reinforced structural composites. In addition, composites of SURLYN® with a wide selection of micro- and nanoscale constituents such as multi-walled carbon nanotubes, ferromagnetic particles, piezoelectric particles, and carbon fibers, can be fabricated by melt processing.

Fabrication of SURLYN®-Based Composites

SURLYN® can be fabricated by melt processing into various geometries owing to its molecular structure. Two approaches were investigated for incorporating micro- and nanoscale components (PZT-5H, NiZnFe, and MWCNTs) into SURLYN®. In the first approach, SURLYN® sheets were fabricated by melt pressing, and two such sheets were assembled with the smart material constituent and subsequently melt processed. In many cases, it was observed that this led to an unfavorable distribution of the particulate constituents in SURLYN®.

In a second approach, a twin-screw Brabender extruder was employed to premix SURLYN® pellets with a nano-constituent. The premixed pellets were subsequently melt pressed into coupons with a homogenous distribution of particles in the polymer matrix. It should be noted that the processing temperature during the fabrication of PZT-SH containing composite should not exceed the Curie temperature of the piezoelectric phase. The processing temperature of 135° C.-145° C. for SURLYN® with PZT-5H is less than the Curie temperature and hence leads to a functional smart material component within the polymer matrix. Thus, the fabrication of the stock material for use in the additive manufacturing techniques described herein requires starting with poled piezoelectric particles dispersed in the polymer.

Characterization of SURLYN®-Based Composites

As discussed above, the addition of micro- or nanoscale constituents with the SURLYN® forms composite materials that are less plastic and exhibit a higher tensile strength than SURLYN®. The addition of a nanophase particulate constituent will not alter the melt temperature. The viscosity of SURLYN® with particulate components increases with the volume fraction. Damages in SURLYN®-based coupons can be reversed by the application of heat. There exists a threshold heating power required to rapidly raise the temperature of SURLYN® for healing, and projectile penetration through SURLYN®-based composites can lead to autonomous self-healing.

Given these characteristics, SURLYN® with micro- and nanoscale constituents is an excel lent candidate for thermal processing before the onset of thermal degradation. Further, the structural components fabricated with SURLYN® can demonstrate self-healing with recovery of the original microstructure.

Ionic Aggregation and Molecular Dynamics Simulations

For additive manufacturing, it is important that layer being added, which is at increased temperature, be able to (i) flow easily enough to be extruded from the tip, (ii) hold its shape once extruded, and (iii) bond strongly to the next layer. Interestingly, these features are related to the required properties of materials that can self-heal after ballistic impact. In that case, the material must quickly spring back into place after impact, then the interfaces must locally adhere strongly to cause full healing. The material is hot at the interfaces due to the impact, but must not melt entirely and macroscopically flow. Thus, knowledge of how to control self-healing in Surlyn and related ionomers can inform the understanding of how these materials perform when used in FDM-type additive manufacturing.

SURLYN® 8940 demonstrates reversible healing of damage with the application of heat. The mechanism of healing in SURLYN® is attributed to the cross-linking like behavior of the ionic groups and thermomechanical processes in the polymer. The healing ability varies with composition, additives, and nanoparticulate constituents. SURLYN®, embedded with micro- and nanoscale piezoelectric particles, which serve to generate eddy current losses in the polymer from a ballistic event, can exhibit autonomous self-healing such that the induced heating from impact alone can drive the healing process to completion.

The adhesion of ionomers at interfaces depends on molecular scale processes and the formation of ionic aggregates, and that particle affect the adhesion in multiple ways. To enable the rational design of new materials, it is important understand how to control such adhesion. Molecular level modeling can be used to connect the polymer architecture and related aggregate morphology and dynamics to the interfacial adhesion strength under various conditions.

Simulations of the bulk SURLYN® system with and without nanoparticles will be compared with experimental scattering data. Subsequently, simulations with a free surface will be performed to determine the structure of aggregates at the interface, as well as the effect of an electric field or a nanoparticle on this structure as a function of field strength or distance of the particle from the interface. Finally, two surfaces will be brought together to study the dynamics of adhesion and final morphology as a function of initial surface aggregate morphology.

The long time and length scales relevant to ionic aggregation and the strong, long-ranged attractions involved make atomistic or even very detailed coarse-grained simulations extremely expensive or impossible. To make the simulations tractable, simple coarse-grained models that capture the molecular level physics are of interest. For example, a model can include the different types of chemical groups in the polymer and how they are connected, along with the full electrostatic interactions between ions. SURLYN® is composed of two types of monomer units—ethylene and methacrylic acid (MAA)—polymerized in random order into a branched polymer chain. The MAA groups are partially neutralized, meaning acid groups become $COO^-$ groups paired with unbonded, positively charged counterions (in this case, the counterion is $Na^+$). These charged groups and counterions strongly attract in the relatively low dielectric constant medium of the rest of the polymer, forming ionic aggregates. Hall and coworkers modeled a polymer that is chemically very similar in a prior work. The model simplifies the polymer into a string of spherical "beads" instead of representing each atom individually (i.e. the model is coarse-grained). The model system does not consider the effect of unneutralized acid groups—the experimental polymer was only partially neutralized, and all uncharged groups were assumed to be chemically identical. Nevertheless, the simulations reproduced experimental scattering trends (relating to the ionic aggregates) as the periodicity and amount of ionic groups was changed.

Furthermore, new insights into the aggregate morphology and dynamics emerged from these simulations that were not evident from prior extensive experimental characterization, in part because a clear representation of aggregates and their motions cannot be obtained experimentally. Specifically, the empirically proposed structure of spherical aggregates was confirmed for systems with the sharpest ionomer scattering peaks, but a more extended aggregate structure was shown to be preferred for randomly spaced systems, even though their experimental scattering peak is qualitatively similar. The main mechanism of ion transport was shown to involve a collective rearrangement process during which ions transfer between nearby clusters, in contrast to the previous picture of many individual, uncorrelated ion-hopping events.

The branched polymer architecture (due to the branched nature of SURLYN® chains) will be taken into account, and a free surface in addition to only the bulk material will be modeled. In addition, the modeling discussed above considered a fully repulsive potential between uncharged beads, modeling the free surface will requires the use of a relatively longer-ranged, attractive potential (Lennard-Jones with a cutoff of 2.5 monomer diameters). Simulations using this adjusted potential were used to calculate the material properties and aggregation behavior as a function of tension. It was observed that the aggregates align as suggested by experimental data collected during tensile strain experiments.

Preparation of Nanophase Structural Ionomers and Smart Material Components

Samples needed for characterization of SURLYN® can be fabricated via melt mixing and melt pressing as coupons. Relevant geometries required for mechanical characterization and thermomechanical characterization can be fabricated using appropriate metal platens used in the melt press. The platens can be nanopatterned to create nanostructured aggregation using electrostatic fields and subsequently characterized via small-angle X-ray scattering and nanoindentation.

Development of a Coarse-Grained Model to Understand Ionic Aggregation

The polymer connectivity and attractions between the uncharged monomers are captured by a Kremer-Grest or "bead-spring" type of model in which spherical monomers/beads are connected by finitely extensible springs strong enough to prevent chain crossing. (This is especially relevant because non-crossing of polymer backbones that are bridging among aggregates or looping back in a single aggregate may be important understanding aggregate dynamics, which have physical similarities with chain entanglements.) All monomer-monomer interactions use the full Lennard-Jones (LJ) form. When treating dense bulk systems with such a model, the attractive portion is relatively unimportant compared to the much stronger repulsions and typically is neglected because the shorter ranged potential makes the simulation faster. However, since free surface will be included, the attractions between even uncharged particles are important: without attractions the material will not be held together at the proper local density near the interface.

Typically a bead-spring polymer model is used with a Langevin thermostat, but due to the interest in mechanical and ion transport properties, a dissipative particle dynamics (DPD) thermostat (but not full DPD, in which the particles are allowed to overlap) will be used. Like the typical Langevin thermostat, the DPD thermostat includes random forces relevant because of the missing degrees of freedom in the coarse-grained model, but the DPD thermostat conserves momentum so may capture transport better. This combination (Kremer-Grest model with DPD thermostat) will work well.

In order to map the model to our specific chemical system, each bead represents three heavy atoms; this means that 3 $CH_2$ units along the chain correspond to one polymer bead. The MAA group is represented by an uncharged bead in the polymer backbone (representing $CH_2$—C—$CH_3$) and an attached charged bead of the same size (representing $COO^-$), and uncharged beads will be used for ethylene (representing 3 $CH_2$). Based on the size of 3 $CH_2$ units and the ion diameter of $Na^+$, counterions will be half the diameter of a polymer beads.

In contrast to some alternative polymer modeling methods such as full DPD or self-consistent field theory, the fact that the monomers are finite size and non-overlapping is clearly represented in this model. Thus, the local bead-scale packing will be especially relevant in and around the ionic aggregates (which locally pack into small crystal-like structures) and near the nanoparticle. The hardness also means that full Coulomb interactions can simply be added onto the potentials of the existing Kremer-Crest model. The long-range part of the Coulomb potential will be computed by the particle-particle particle-mesh method implemented in the open source molecular dynamics program LAMMPS, which also allows easy implementation of all the described potentials and thermostat.

The branched nature of SURLYN® will also be modeled. Using model polymers of modest lengths but with appropriate placement of ions and of branching, the relevant features of the experimental system of much longer polymers will be captured. This relies on the fact that virtually all ions will be strongly associated with ionic aggregates. Uncharged sections of the polymer backbone that are bracketed by ions on either end are constrained between those aggregates over relatively long times compared to local polymer relaxation. This implies that the spacing between ions, including whether there are branches along the chain between the ions, is important because it sets the length of loops and bridges coming from an aggregate, but longer length scale details of the polymer architecture are less important. Therefore the polymer model need only be a few times longer than the average distance of ions along the chain.

SURLYN® is synthesized such that the branching and relative placement of the ethylene versus MAA monomers is close to completely random. Based on experimental studies of ethylene copolymers, the density of branching points in the system can be approximated. Thus, the coarse-grained system will be constructed as follows: starting from a random position of an initial monomer, monomers will be added one by one with each added bead randomly assigned to have a pendant charged group or not. To handle the branching, each bead is randomly assigned to be a new branch point or not to yield the correct overall branching frequency, then each branch is followed, recursively, adding beads until a stopping condition is met. There are two possible stopping conditions: 1) the current branch can be terminated with the correct probability to approximate the real system's termination process, or 2) after a charged bead is placed, the chain could be ended by adding a short random tail (of half the average length between ions). The first stopping condition simulates the chances of finding uncharged branches, and the second stopping condition is to limit the size of the generated polymers without losing the overall topology between the ions. This distance between ions is relevant to the length of polymer bridges between aggregates; although the amount of bridging will be less than for longer polymers, a segment of the half of the typical length between ions placed at the end of the chain can contribute to a similar length scale between aggregates as a bridge. The degree with which the randomness of this process influences the outcome of this result can be iteratively evaluated by performing this aforementioned procedure twice with different random seeds and comparing both systems.

Ionic aggregation will likely also be affected by the presence of hard piezoelectric nanoparticles around which the polymer must organize. Depending on the number of particles and their proximity to the surface, this will also affect the interfacial adhesion. These effects will be quantified to allow the additive manufacturing process of smart materials to be optimized as a function of temperature, particle size, and particle concentration.

Particles in a polymer melt tend to aggregate together due to very strong, entropy-driven depletion attraction or direct van der Waals attraction at contact. One way to achieve good dispersion is to choose the chemistry of the polymer and the particle surface such that the polymer adsorbs on the particles, creating an adsorbed polymer layer that prevents particles from getting close enough to experience the strong attraction at contact. The adsorbed polymer layer underlies the structure and dynamics of the entire system Our simulations will determine to what extent ionic aggregates will form on the surface of the particle, how this will change the size and shape of aggregates, and how far from the surface the effect of the nanoparticle will persist.

Many parameters are potentially involved in setting how the polymer adsorbs, including the polymer length, stiffness, and the polymer-polymer and polymer-particle interactions. Much of the behavior of a polymer-nanoparticle system can be understood in terms of a single chemical parameter $\in$. This parameter represents the gain in enthalpic energy of a monomer coming into contact with the nanoparticle versus in the particle-free polymer solution. The other relevant parameters are either known (such as the volume fractions of particles, polymer, and solvent) or do not qualitatively change the results for the systems considered (such as polymer length). Specifically, a pairwise enthalpic attraction between monomers and particles with contact strength $\in$ and an exponential decay as a function of distance was used, with all other pairwise interactions kept constant. Thus, this attraction accounted for all the important chemistry of the system. Using the experimental scattering data, a certain value of r was shown to accurately describe the major features of the scattering data for the test system of silica particles in polyethylene oxide over the entire feasible range of volume fractions of particles; simply using a different value off accounted for the changes in miscibility and scattering when a chemically different polymer was used.

The same model can be used for the current system by calculating the total strength of attraction between all elements that make up one of our coarse-grained units and a similar sized region of a nanoparticle using standard atomistic potentials. Because the particle has a high dielectric constant relative to the polymer background, the ions should be relatively more attracted to it than to areas of uncharged polymer. To model this behavior but without a variable dielectric constant, the strength of the attraction between the ions and the nanoparticle can be increased.

A fundamental problem in applying molecular dynamics (MD) simulations to polymer-particle mixtures is that the simulation needs to at least represent the following elements of the system well: 1) the small length scale liquid-like order of monomers and their adsorption on the particle, 2) the much longer length scale of at least one particle plus affected polymer (the particle affects the polymer out to a considerable distance), and 3) the time scales of dynamic relaxation of the system, which will be long for long polymers or when strong adsorption is involved. Since the monomers are much smaller than the particle, many are required to fill the space around the particle. So, the simulation will have a large number of beads that must be simulated for a long time. In a many-nanoparticle simulation, the particles would need to have time to move and eventually come to equilibrium with respect to their state of dispersion In the polymer (for instance, if the particles are going to aggregate they will need time to find each other in the box). The time scales involved are likely unreasonably long for all but the smallest nanoparticles, so simulations here will instead be performed with a single particle in the simulation box. In that case, the polymer must equilibrate around the particle, and the box must be much larger than the particle plus any affected polymer layer around the particle, but the particle does not need to move to explore the box.

While many simplifications have been or will be made in these models, the most important physics are included, and thus the qualitative trends as a function of polymer architecture that are relevant to the aggregates will be captured. To ensure the model captures the structure of SURLYN® around nanoparticles, structure factors from the simulation will be compared with scattering data, and the polymer-particle adsorption strength can be adjusted to best model the experimental system. With the proper adsorption strength in use, the simulations will be able to show the detailed morphology of aggregates as a function of temperature and distance from a nanoparticle surface.

Characterization of Aggregation Above Melt Temperature Under Electrostatic Fields After the model is verified using the bulk simulations, the main production simulations will be performed with a free interface to a vacuum in order to quantify the formation of aggregates near the surface and to look at adhesion properties. For simulations without nanoparticles, the system will be initialized in a similar manner as a bulk system except that beads will only be placed in a specific range of z-values; this creates two free surfaces at either end of this range, and the box will be long enough in the z-direction such that bulk properties are reached in the middle of the box and there is not a significant effect of one surface on the other. After equilibration, production runs of these systems will be performed and statistical data (size, shape, percolation, etc.) about the aggregates will be collected.

The specific features of interfacial aggregate structure—potentially affected by the presence of a particle—will lead to variations in the dynamics and final strength of adhesion. A set of simulations will explicitly determine the strength of interfacial adhesion as a function of temperature. For these, the simulation box will consist of two films of polymer at either end of the z-axis separated by a small volume of vacuum. Walls will be placed at the terminal ends of the z-axis (a sufficient distance from the free surface so that the wall effects are negligible for most of the system), and the x and y-axes will be periodic to simulate a wide, flat area. The adhesion test will be performed as follows: after the two-film system is equilibrated, one of the terminal z-axis walls will move slowly to a point that would give the whole system the bulk density. The energy of the system will be monitored as a function of distance and as a function of time once the surfaces have been brought together; as aggregates form across the interface, the total energy will drop. This change in energy will be quantified as a function of temperature; a faster drop in energy as the surfaces are brought together and lower total energy at long times would show stronger adhesion. For each temperature under consideration, after various pre-specified waiting times, the wall will be moved back to its original position (there will be a local attraction between polymer and wall so that the polymer will tend to break at the interface rather than pulling away from the wall) and the response of the system as a function of applied force can be observed.

To determine the effect of a nanoparticle, a free surface simulation will be performed with a single particle at a fixed location from the interface. Several runs will be performed with different relative starting locations of the particle. We will observe how the polymer organizes itself (and how the aggregates form) around the particle as a function of the distance between the particle and the interface. A 'change the aggregate morphology, especially near the interface, could be important to adhesion properties.

Finally, to determine the effect of electric fields on interfacial ionic aggregation, a constant electric field will be added to the previously equilibrated free surface simulation systems. Four different simulations will be performed for each system, with the field added either parallel or perpendicular to the interface and the strength of the field set to either a relatively low or moderate value based on the range of electric fields found to be reasonable for the experimental nozzle system. The change in aggregate morphology as a function of time since the field is added will be quantified, as will the final equilibrium aggregate morphology as a function of distance from the interface.

An important outcome of the adhesion simulations will be to correlate the interfacial aggregate morphology to the adhesion results. Understanding this mapping, general design principles will be determined based on observing the aggregates near interfaces as a function of temperature, electric field, and particle distance from the interface. The most salient results of this task will be to elucidate the detailed structure of ionic aggregates near an interface as a function of temperature; identify the effect of temperature on interfacial adhesion; and determine how an electric field or nanoparticle near the interface changes aggregate morphology.

SURLY®-based composites will be characterized through experiments that will correlate with the results obtained from molecular dynamics studies. Significant characterization studies proposed to compare results from molecular dynamics models with fabricated coupons are discussed below:

Small angle x-ray scattering (SAXS): The ionomers can be visualized as spherical ionic aggregates dispersed in a hydrocarbon matrix. The spherical ionic aggregates are considered to behave like spheres of uniform scattering density in the matrix of lower scattering density that are organized as though they are hard spheres of a larger size (because they are surrounded by an associated polymer layer). Thus, the arrangement of aggregates in the polymer matrix leads to scattering of incident X-rays. Small angle X-ray scattering (SAXS) data observed from ionomers similar to SURLYN® has shown that the profile is dependent on size of the aggregates, moisture level and crystallinity of the polymer matrix. In the proposed study, the polymer is not crystalline and sufficient care can be taken to extract moisture from the polymer samples before SAXS characterization. The nanoparticles present in the polymer in the absence of externally imposed mechanical boundary conditions will remain uncharged. So, with sufficient care, will be fairly easy to characterize the polymer to estimate the size and distribution of the aggregates using SAXS.

Differential Scanning calorimetry: DSC on SURLYN®-based composites with PZT-5H, Terfenol-D, and ZnO will be performed. The effect of micro- and nanophase components on the melt temperature of SURLYN® composites will be characterized. Premixed samples of SURLYN® with the particulate components will be prepared using a twin-screw extruder of various mass fractions and used for this study.

Rheology: Quantitative measurements of viscosity will be carried out using a TA Instruments rheometer. The premixed samples of SURLYN® with particulate components prepared on the twin-screw extruder will be used for characterization. The viscosity measurements will be used to understand the melt-flow behavior of SURLYN® with particulate components and facilitate designs of the extruder. In addition, a flow channel will be used to quantify changes in viscosity of SURLYN® as a function of an applied electrical boundary condition.

Scanning Probe Microscopy: The fabricated samples will be imaged using scanning probe microscopy (AFM) to characterize the morphology of the polymer with/without particulate constituents. Further, the samples will also be characterized using Hysitron nanoindenter to obtain local mechanical properties around the particulate constituent.

Fabrication of Extruder Nozzle and Composites

The basic arrangement of the extruder nozzle is shown in FIGS. 2-5. A micron-scale extruder with a reciprocating needle will be used for extruding hot nanoscale beads of SURLYN® that, when deposited on the surface, will coalesce to form the printed part. The control system required to maintain a uniform temperature and flow rate of SURLYN® will be developed from lumped parameter approaches.

Results obtained from characterization studies will be used in control system design. Two 4-axis Sutter nanopositioners will be used for positioning the extruder and building simple coupons and simple geometrical shapes. The electric field that is applied to control the aggregation of charged groups in the polymer will serve the additional purpose of poling the piezoelectric component. The coercive field required for poling various piezoelectric constituents will be obtained from the manufacturer or measured from polarization curves.

Characterization of Composites for Sensing and Actuation Function

The coupons fabricated will be characterized mechanically and electrically for their tensile strength, layer adhesion, sensing and optical clarity. For example, a test sample with piezoelectric powder will be fabricated with silver epoxy terminals. The silver epoxy will form the terminals for the piezoelectric phase within the part. Electrical terminals will be formed with the epoxy layer after the build is completed to finish the part. While silver epoxy can be made to adhere to microscopic holes in SURLYN®, it is not clear how the epoxy layer will behave in the presence of hot SURLYN®. If bonding strength of epoxy layer will not allow for sufficient adhesion between the SURLYN® piezoelectric phase and the electrodes, carbon or gold sputter will be used. While this might add an intermediate step in the product build, this step could be made integral to the 3D printing system.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. An additive manufacturing apparatus comprising:
   a movable head having a first actuator coupled to a first ejection port to regulate dispensation of a thermoplastic ionomer fed from an elongated chamber located in the movable head and coupled to the first ejection port,
   wherein the movable head comprises a pair of electrodes that are distinct from the chamber and are fixably coupled to or within the chamber so as to direct an electric field, when the electrodes are energized, thereacross or therethough and to induce orientation of the thermoplastic ionomer as the thermoplastic ionomer is fed from the elongated chamber,
   each of the pair of electrodes having a length corresponding to an axis of elongation associated with the elongated chamber wherein the axis of elongation is in a direction along which the thermoplastic ionomer moves through the elongation chamber to the ejection port,
   wherein the pair of electrodes comprise an actuator element and a chamber element, wherein the actuator element comprises a needle member configured to move within and along, between a dispensing configuration and a closed configuration, the elongated chamber, and wherein the chamber element comprises a plate member fixably coupled to the elongated chamber;
   an electric circuit operatively connected to the pair of electrodes, the electric circuit being configured to generate the electric field having a magnitude sufficient to induce macroscopic flow of the thermoplastic ionomer to a substrate where required to form a three-dimensional object, and
   a thermal processing element for softening the thermoplastic ionomer simultaneously as the thermoplastic ionomer is fed from the elongated chamber,
   wherein the movable head is movably coupled to a guide rail that drives its motion along an axis to cause movement between the ejection port and the substrate as the thermoplastic ionomer is dispensed from the ejection port.

2. The apparatus of claim 1, wherein the additive manufacturing apparatus comprises a 3D printer.

3. The apparatus of claim 1, wherein the chamber element is fixably coupled to an interior surface of the elongated chamber.

4. The apparatus of claim 1, wherein the chamber element is fixably coupled to an exterior surface of the elongated chamber.

5. The apparatus of claim 1, wherein the plate member comprises a curved surface.

6. The apparatus of claim 1, wherein the movable head comprises a second actuator coupled to a second ejection port to regulate dispensing of a thermoplastic polymer fed from a second chamber located in the movable head.

7. The apparatus of claim 6, wherein the first ejection port has a first aperture size, and the second ejection port has a second aperture size, the second aperture size being larger than the first aperture size.

8. The apparatus of claim 6, wherein the thermoplastic ionomer further comprises functional nanoparticles dispersed therein, and
   wherein the apparatus further comprises a controller operatively coupled to the movable head, the controller having a processor and a memory, the memory having instructions stored thereon, wherein execution of the instructions, cause the processor to direct control signals i) to the second actuator to dispense the polymeric material to form a structural member and ii) to the first actuator to dispense the thermoplastic ionomer to form a sensor embedded within, and contiguous with, the structural member.

9. The apparatus of claim 1, wherein the thermoplastic ionomer further comprises functional nanoparticles dispersed therein.

10. The apparatus of claim 9, wherein the functional nanoparticles comprise piezoelectric nanoparticles.

11. The apparatus of claim 10, wherein the functional nanoparticles comprises piezoelectric nanoparticles, and wherein the electric circuit is configured to generate a poling voltage.

12. The apparatus of claim 9, wherein the functional nanoparticles comprise magnetostrictive nanoparticles, mechanoluminescent nanoparticles, conductive nanoparticles, or a combination thereof.

13. The apparatus of claim 1, further comprising:
   a controller operatively coupled to the movable head, the controller having a processor and a memory, the memory having instructions stored thereon, wherein execution of the instructions, cause the processor to direct control signals to the first actuator to dispense the thermoplastic ionomer.

14. The apparatus of claim 1, wherein the electric circuit is configured to generate a direct current (DC) biased with an alternating current (AC) field.

15. The apparatus of claim 1, comprising:
   a second pair of electrodes proximately positioned relative to the chamber so as to direct a second electric field, when the electrodes are energized, thereacross or therethrough.

16. The apparatus of claim 15, wherein each of the second pair of electrodes has a second poling length corresponding to the axis of elongation associated with the elongated chamber.

* * * * *